(12) United States Patent
Rebhi et al.

(10) Patent No.: US 9,266,617 B2
(45) Date of Patent: Feb. 23, 2016

(54) PROPULSIVE SYSTEM

(71) Applicant: ROLLS-ROYCE PLC, London (GB)

(72) Inventors: Betka Rebhi, Oakwood (GB); Lorenzo Raffaelli, Alvaston (GB); Andrew Martin Rolt, Allestree (GB)

(73) Assignee: ROLLS-ROYCE plc, London (GB)

( * ) Notice: Subject to any disclaimer, the term of this patent is extended or adjusted under 35 U.S.C. 154(b) by 765 days.

(21) Appl. No.: 13/644,509

(22) Filed: Oct. 4, 2012

(65) Prior Publication Data

US 2013/0101392 A1    Apr. 25, 2013

(30) Foreign Application Priority Data

Oct. 24, 2011 (GB) .................................. 1118289.6

(51) Int. Cl.
*B64D 27/02* (2006.01)

(52) U.S. Cl.
CPC ............. *B64D 27/02* (2013.01); *B64C 2230/28* (2013.01); *Y02T 50/166* (2013.01)

(58) Field of Classification Search
CPC ........ B64C 11/46; B64D 29/00; B64D 29/02; B64D 29/04; B64D 27/24; B64D 27/02
See application file for complete search history.

(56) References Cited

U.S. PATENT DOCUMENTS

| | | | |
|---|---|---|---|
| 6,543,718 B2 * | 4/2003 | Provost | 244/12.4 |
| 2008/0164378 A1 | 7/2008 | Owens et al. | |
| 2011/0168835 A1 | 7/2011 | Oliver | |

FOREIGN PATENT DOCUMENTS

| | | |
|---|---|---|
| AU | 532184 | 9/1983 |
| DE | 10 2008 027 275 A1 | 1/2010 |
| DE | 10 2008 024 463 B4 | 2/2011 |
| FR | 640855 | 7/1928 |
| FR | 1443200 | 6/1966 |
| GB | 974384 | 11/1964 |
| GB | 1024894 | 4/1966 |
| GB | 2 433 733 A | 7/2007 |

OTHER PUBLICATIONS

Dec. 13, 2012 European Search Report issued in European Patent Application No. 12 18 7090.
Feb. 15, 2012 British Search Report issued in Patent Application No. GB1118289.6.

* cited by examiner

*Primary Examiner* — Richard Edgar
(74) *Attorney, Agent, or Firm* — Oliff PLC

(57) ABSTRACT

This invention relates to an aircraft comprising: a first propulsive unit having a first fan with an axis of rotation; and a second propulsive unit local to the first propulsive unit, the second propulsive unit having a second fan with an axis of rotation, wherein the rotational axis of the first fan is proximate to the surface of the aircraft relative to the rotational axis of the second fan such that the first fan ingests boundary layer air when in use.

8 Claims, 3 Drawing Sheets

PROPULSIVE SYSTEM

TECHNICAL FIELD OF INVENTION

This invention relates to a propulsive system for an aircraft. In particular, the invention relates to a propulsive system for ingestion of boundary layer air.

BACKGROUND OF INVENTION

Conventional state of the art propulsion systems for large civil aircraft typically include one or more gas turbine engines placed under the wings of the aircraft. However, some studies have indicated that so-called distributed propulsion, which involves having numerous smaller propulsion units preferentially arranged around an aircraft, may provide some significant benefits in terms of noise reduction and fuel efficiency when compared with the current state of the art propulsive arrangements.

One known option for distributed propulsion is to provide numerous propulsive units which are located so as to capture and accelerate slow speed boundary layer air which has formed against the surface of the aircraft. This can lead to a significant reduction in overall fuel burn with the maximum benefit of boundary layer ingestion being achieved when the low speed flow is not mixed with the freestream flow, but is accelerated to homogeneous conditions by the propulsion system.

However, delivering the required power at an acceptable level of efficiency by ingesting boundary layer air can be problematic for conventional propulsive systems, particularly where the propulsive unit is required to be larger than the thickness of the boundary layer air flow.

The present invention seeks to provide an improved propulsive device for ingesting boundary layer air.

STATEMENTS OF INVENTION

In a first aspect, the present invention provides an aircraft comprising: a first propulsive unit having a first fan with an axis of rotation; and a second propulsive unit located so as to receive an airflow from the first propulsive unit, the second propulsive unit having a second fan with an axis of rotation, wherein the rotational axis of the first fan is proximate to the surface of the aircraft relative to the rotational axis of the second fan such that the first fan ingests boundary layer air when in use.

Providing an arrangement according to the first aspect allows the propulsive units to ingest both boundary layer air and free stream air with a greater efficiency and also helps reduce vibration and mechanical wear in the propulsive system.

The first and second propulsive units may be any one or more of: adjacent to one another; in a linear series; upstream and downstream and stacked one on top of the other; placed on a similar surface on the aircraft; and, separated by a dimension which is less than twice the diameter of the second fan. The second propulsive unit may be arranged so as to receive an airflow from an outlet of the first propulsive unit.

The rotational axes may be in a common plane. The common plane may be vertical.

There may be a plurality of first propulsion units for each second propulsive unit. The first propulsive units may be arranged across an inlet of the second propulsive unit.

The diameter of the first fan may be smaller than that of the second fan. The first fan may have a diameter in the range of between 40 cm and 62 cm. The second fan may have a diameter in the range of between 200 cm and 325 cm. Hence, the ratio of the first fan diameter to the second fan diameter may be between approximately 0.12:1 and 0.3:1. It will be appreciated that these ranges may vary depending on the number installed and the aircraft design and the ratio may be up to 0.4:1.

The first fan may be upstream of the second fan and accelerate boundary layer air for ingestion of the second fan.

The second fan may be adjacent to a surface of the aircraft.

The propulsive unit may further comprise a plurality of first propulsive units for each second propulsive unit.

The outlet of the first propulsive unit may be ducted into the second propulsive unit downstream from the blades of the second fan.

The axial separation between the outlet of the first and second fan may be a maximum of twice the second fan diameter.

DESCRIPTION OF DRAWINGS

Embodiments of the invention will now be described with the following drawings in which.

DETAILED DESCRIPTION OF INVENTION

Figure 1:
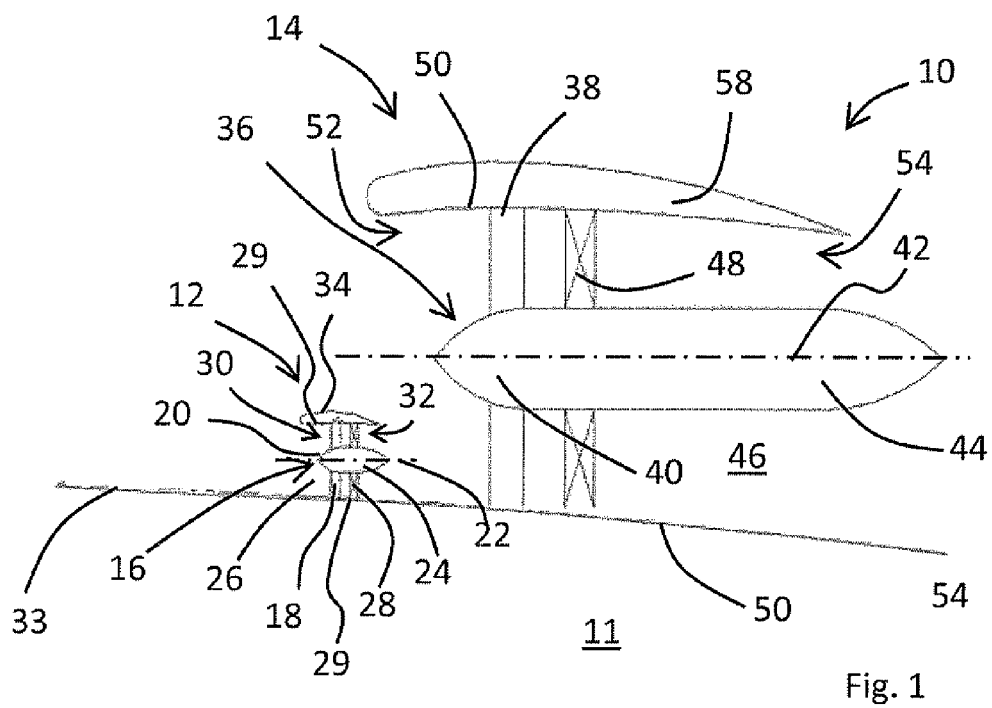
FIG. 1 shows a cross-sectional representation of a first arrangement according to the present invention.

FIG. 1 shows a propulsive system 10 for an aircraft 11 comprising a first propulsive unit 12 and a second propulsive unit 14.

The first propulsive unit 12 includes a first fan unit 16 having a plurality of blades 18 mounted on a rotatable hub 20 having a rotational axis 22. The rotatable hub 20 is mounted to and driven by an electrical machine drive 24. The drive 24, hub 20 and blades 18 are supported within a duct 26 by a plurality of struts 28. The duct 26 is bounded by a duct wall 29 and has an inlet 30 for receiving air and an outlet 32 for exhausting air and providing a propulsive force to the aircraft 11.

The first propulsive unit 12 is mounted on a surface 33 of an aircraft 11 such that the lower parts of the duct 26 wall provide a continuation of the aircraft surface 33 and the upper parts define a nacelle 34. As will be appreciated, the duct 26 is dimensioned to provide a close fit for rotational path of the fan blades 18 and may include abradable fan track liners and acoustic treatments as are known in the art but not shown here for the sake of clarity. It will also be appreciated that, although incorporating the duct 26 into the surface of the aircraft so as to provide a smooth gas washed surface is advantageous, it is not a limitation of the invention and the duct wall can be located on a support structure such as a pylon. Further, it will also be appreciated that in this case, the term propulsive does not imply that the first unit exhausts an airflow which directly propels the aircraft. Nevertheless, the air accelerated by the first fan unit does act to propel the aircraft when in use, even if it is after the air has been further accelerated by the second propulsive unit.

The inlet 30 is positioned such that the first fan unit 16 can ingest and accelerate so called boundary layer air, Boundary layer air is air which forms close to the surface of an aircraft 11 and as such has a low flow velocity. Boundary layer air on a conventional tube and wing aircraft is typically thickest towards the rear portions of the fuselage and the rearward portions of the wings. By referring to boundary layer air it will be understood that the term relates to a layer of air on a surface in contact with a moving fluid and may be defined as the portion of the flow near to the surface with a speed that is below 99% of the speed of an equivalent inviscid flow at the same location and conditions. When the velocity of the flow is above 99% of the inviscid case (e.g. almost unchanged) the flow is considered to be outside the boundary layer. Thickness of the boundary layer increases proportionally to the length of the surface it is flowing onto, as it is slowing down due to friction effects.

The second propulsive unit 14 is similar to the first propulsive unit 12 in that it includes a second fan unit 36 having a plurality of blades 38 mounted on a rotatable hub 40. The rotational hub 40 has rotational axis 42 and is mounted to and driven by an electrical machine drive 44. The blades 38, hub 40 and drive 44 are all supported within a duct 46 by a plurality of struts 48. The duct 46 is bounded by a duct wall 50 and has an inlet 52 for receiving air and an outlet 54 for exhausting air and providing a propulsive force to the aircraft 11.

The lower parts of the second propulsive unit duct wall 50 provide a continuation of the aircraft surface 33 and the upper parts define a nacelle 58. As will be appreciated, the second propulsive unit duct 46 is dimensioned to provide a close fit for the rotational path of the fan blades 38 and may include abradable fan track liners and acoustic treatments as are known in the art but not shown here for the sake of clarity. It will also be appreciated that, although incorporating the duct 46 into the surface 33 of the aircraft 11 so as to provide a smooth gas washed surface is advantageous, it is not a limitation of the invention and the duct wall 50 can be located on a support structure such as a pylon.

The first propulsive unit 12 is mounted upstream of the second propulsive unit 14 on the surface 33 of the aircraft 11 with the rotational axes 22, 42 of the two units running in parallel. The first propulsive unit 12 is smaller than the second propulsive unit 14 in that the diameter of the first fan unit 16 is smaller than the diameter of the second fan unit 36. This means that the rotational axis 22 of the first fan unit 16 is proximate to the surface 33 of the aircraft 11 relative to the rotational axis 42 of the second fan unit. In other words, the inlet or nacelle of propulsive unit 12 is located closer to surface 33 of the aircraft 11 such that it is substantially within the boundary layer air when in use.

In operation, the aircraft 11 moves through the air from right to left with reference to FIG. 1 such that an airflow is created from left to right which is ingested by the propulsive units 12, 14. With the above described arrangement, the first propulsive unit 12 ingests boundary layer air and accelerates it for ingestion by the second propulsive unit 14. The second propulsive unit 14 ingests air which has been accelerated by the first fan unit 16, and free flow air which passes over the first propulsive unit 12. In this way, the total pressure and velocity differential experienced across the span of the second fan units' 36 fan blades 38 is reduced and the air which is ingested is more circumferentially homogenous. This helps reduce mechanical wear and vibrations on the second fan unit 36 which would be experienced if the fan 36 were to ingest both free flow air and un-accelerated boundary layer air.

Figure 2:
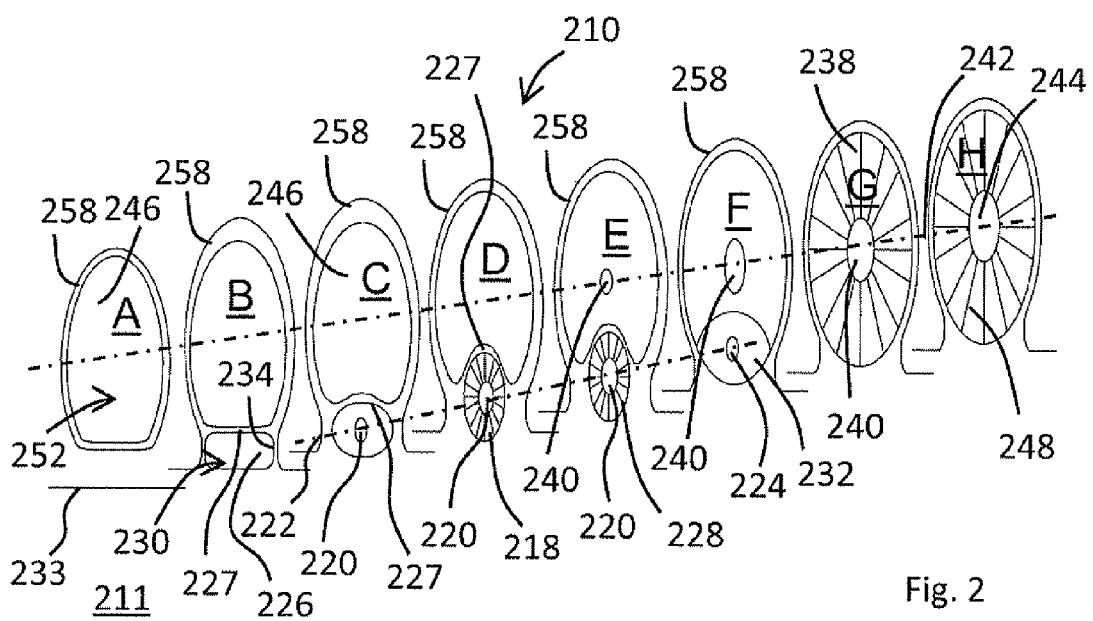
FIG. 2 shows a non-orthogonal expanded axial series of cross sections at evenly spaced intervals along a principal axis of the aircraft propulsive system according to the invention.

FIG. 2 shows an axial series of cross sections, A to H at evenly spaced intervals along the principal axis 242 of the propulsive system. Hence, there is shown sections of the first propulsive unit, A to F, and a second propulsive, F to H, unit which are arranged in a series flow relationship such that air exiting the first propulsive unit enters the second propulsive unit.

The first propulsive unit includes a first fan unit having a plurality of blades 218 mounted on a rotatable hub 220 having a rotational axis 222. The rotatable hub 220 is mounted to and driven by an electrical machine drive 224. The drive 224, hub 220 and blades 218 are supported within a duct 226 by a plurality of struts 228. The duct 226 is bounded by a duct wall and has an inlet 230 for receiving air and an outlet 232 for exhausting air and providing a propulsive force to the aircraft. By propulsive force, it will be appreciated that this may not be a direct propulsive force as the outlet does not provide an airstream which directly exits the aircraft. Nevertheless, the air accelerated by the first fan unit does act to propel the aircraft when in use, even if it is after the air has been further accelerated by the second propulsive unit.

The first propulsive unit is mounted on a surface 233 of an aircraft such that the lower parts of the duct 226 wall provide a continuation of the aircraft surface 233 and the side walls define a nacelle 234. The upper surface of the duct 226 provides a wall 227 which partitions the first and second propulsion units. As will be appreciated, the duct 226 is dimensioned to provide a close fit for rotational path of the fan blades 218 and may include abradable fan track liners and acoustic treatments as are known in the art but not shown here for the sake of clarity.

The second propulsive unit is similar to the first propulsive unit in that it includes a second fan unit having a plurality of blades 238 mounted on a rotatable hub 240. The rotatable hub 240 has rotational axis 242 and is mounted to and driven by an electrical machine drive 244. The blades 238, hub 240 and drive 244 are all supported within a duct 246 by a plurality of struts 248. The duct 246 is bounded by a duct wall in the form of a nacelle 258 on the upper portions and the partition wall 227 on the lower side, and has an inlet 252 for receiving air and an outlet (not shown) for exhausting air and providing a propulsive force to the aircraft.

In further detail, at point A, there is the nacelle 258 which defines an inlet 252 for ingestion of air for the second propulsive unit. The inlet 252 is positioned so as to be separated from the upper surface 233 of the aircraft 211 and thus receive substantially free stream air when in normal use. The skilled person will appreciate that the separation of the nacelle 258 in this manner will be determined by the thickness of the boundary layer air which is to be ingested by the first fan. This in turn will be dependent on the aircraft 211 and location of the inlet 252 on the aircraft.

The inlet extends into a duct 246 which is defined by the nacelle 258 and the partitioning wall 227 and leads to the fan blades 238 as shown at position G. At position B, there is shown the substantially rectangular inlet 230 to the first propulsive unit inlet located in the gap between the nacelle 258 and the upper surface of the wing 233. The sides of the inlet 230 are provided by walls which extend perpendicularly from the upper surface of the aircraft 211 to the underside of the nacelle 258. The inlet 230 extends into a passageway 226 which is defined by the upper and side walls and upper surface 233 of the aircraft 211 and leads to the first propulsive fan unit. Hence, at position C, the duct has morphed into a substantially oval shape having the rotating hub 220 of the first fan unit at its geometric centre. At stage C the duct 226 is circular in cross-section and houses the rotatable fan blades 218 which are mounted to the electric drive 224 so as to have the rotational axis 222.

The first fan unit is supported within the duct 226 via struts 228 in the form of outlet guide vanes, as shown at Figure E. Downstream of the first fan unit, the duct 226 changes to an outlet 232 which is a vesica piscis in shape. By vesica piscis it is meant a cusped or pointed oval having two arcuate sections of equal radii which are mirrored along a plane which extends along the major axis of the oval. However, it will be appreciated that the two arcuate sections may have different radii of curvature, Having a cusped oval for the outlet allows the accelerated air flow to be circumferentially distributed around the fan blades 238.

Also shown at section E is the hub 240 of the second fan unit which occupies a central portion of the second unit's duct 246. The rotating hub 240 is in the form of a cone and thus has a larger cross section at section G prior to the face of the fan 238 at section H. The fan face is positioned downstream of the cusped oval outlet such that it receives free stream air from the second duct 246 and accelerated air from the cusped outlet 232. Downstream of the fan blades 238 of the second propulsive unit are located the struts 238 which support the fan unit within the duct 246 as shown in FIG. 1.

Hence, with the arrangement described in relation to FIG. 2, there is primary propulsive unit for receiving freestream air and a smaller fan unit for accelerating the boundary layer air for ingestion by the primary propulsive unit.

Figures 3A, 3B:
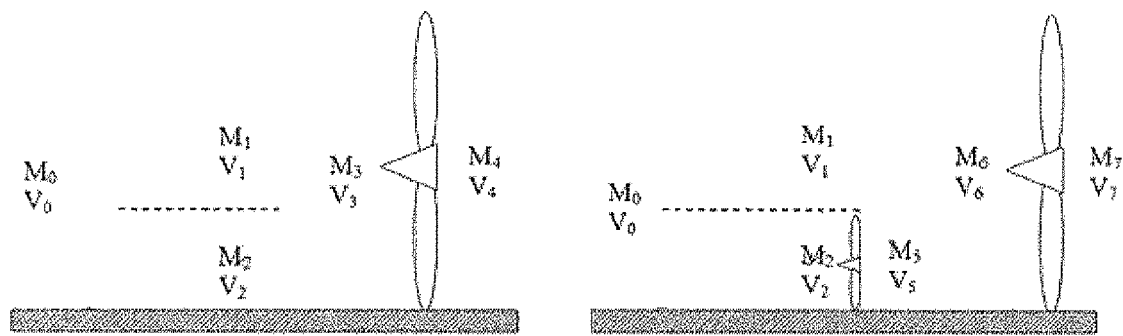
FIGS. 3a and 3b respectively show schematic representations of a prior art arrangement and an arrangement of the present invention.

A further benefit of the arrangement described in FIGS. 1 and 2 is that it provides a more energy efficient propulsive system. FIGS. 3*a* and 3*b* respectively show a prior art arrangement and an arrangement according to the present invention with the additional fan. Typically, the boundary layer airflow below the dotted line will have 0.05 of the total mass flow at 0.8 of the free stream velocity relative to that located above the dotted line. For a low specific thrust a typical fan velocity ratio will be around 1.2. This gives rise to the following approximate relationships which are provided as a mere indication of the potential of the invention, using the mass and mean velocity notation denoted in FIG. 3:

$M_1 = 0.9 M_0$
$V_1 = V_0$
$M_2 = 0.1 M$
$V_2 = 0.8 V_0$
$M_3 = M_0$
$V_3 = 0.98 V_0$
$M_4 = M_0$
$V_4 = 1.2 V_0$
$M_5 = 0.1 M_0$
$V_5 = V_0$
$V_6 = V_0$
$M_6 = M_0$
$V_7 = 1.2 V_0$
$M_7 = M_0$

The energy input into the fan can be equated to the Delta kinetic energy of the flow. Hence:

For the FIG. 3*a* arrangement:

$$\text{Energy} = \frac{1}{2} M_4 V_4^2 - \frac{1}{2} M_3 V_3^2$$

$$= \frac{1}{2} 1.2^2 M_0 V_0^2 - \frac{1}{2} 0.98^2 M_0 V_0^2$$

$$= 0.24 M_0 V_0^2$$

And for the FIG. 3*b* arrangement with the additional fan:

$$\text{Energy} = \text{Energy } Fan1 + \text{Energy } Fan2$$

$$= \left(\frac{1}{2} M_5 V_5^2 - \frac{1}{2} M_2 V_2^2\right) + \left(\frac{1}{2} M_7 V_7^2 - \frac{1}{2} M_6 V_6^2\right)$$

$$= \left(\frac{1}{2} 0.1 M_0 V_0^2 - \frac{1}{2} 0.1 \times 0.8^2 M_0 V_0^2\right) + \left(\frac{1}{2} 1.2^2 M_0 V_0^2 - \frac{1}{2} M_0 V_0^2\right)$$

$$= 0.238 M_0 V_0^2$$

Hence, the energy ratio between the two methods is 0.238/0.24=0.991 which is equivalent to 0.9% saving in energy by using the additional fan.

Figure 4:
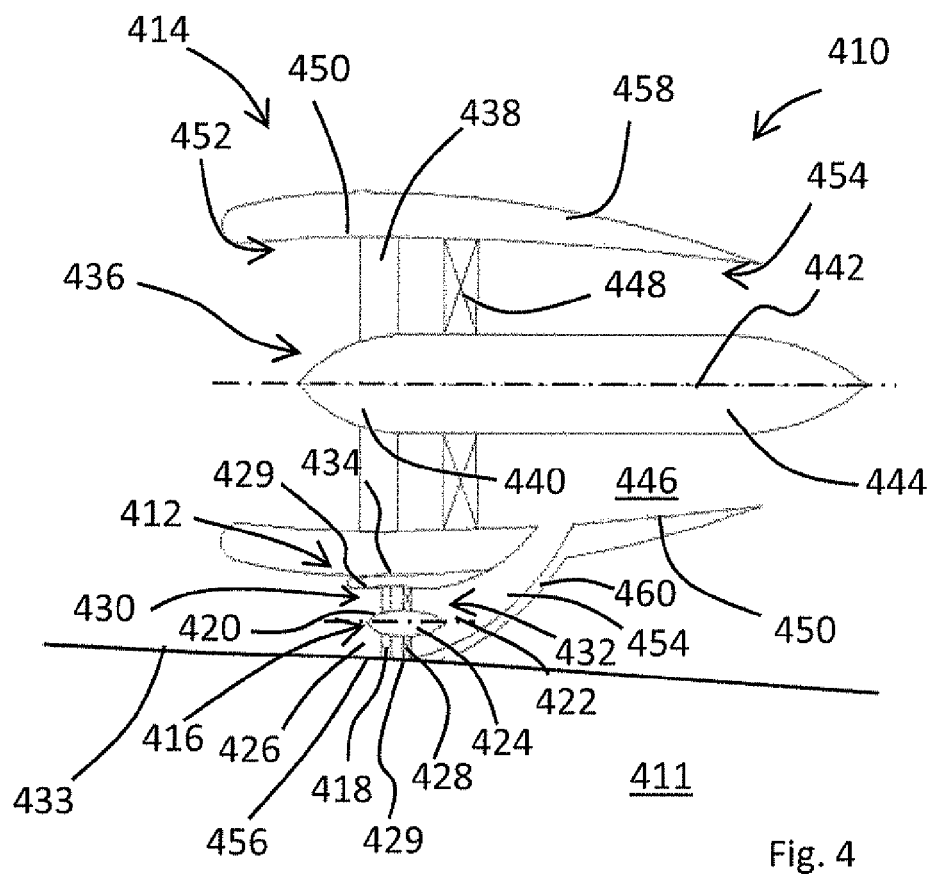
FIG. 4 shows a cross-sectional representation of a second arrangement according to the present invention.

Another embodiment of the propulsive system 410 on an aircraft 411 is shown in FIG. 4. Here, the first 412 and second 414 propulsive fan units are located one on top of the other with respect to the surface 433 of the aircraft 411.

The first propulsive unit 412 includes a first fan unit 416 having a plurality of blades 418 mounted on a rotatable hub 420 having a rotational axis 422. The rotatable hub 420 is mounted to and driven by an electrical machine drive 424. The drive 424, hub 420 and blades 418 are supported within a duct 426 by a plurality of struts 428. The duct 426 is bounded by a duct wall 429 and has an inlet 430 for receiving air and an outlet 432 for exhausting air and providing a propulsive force to the aircraft 11.

The first propulsive unit 412 is mounted on a surface 433 of an aircraft 411 such that the lower parts of the duct 426 wall provide a continuation of the aircraft surface 433 and the upper parts define a nacelle 434 which provides support for the second propulsive unit 414. As will be appreciated, the duct 426 is dimensioned to provide a close fit for the rotational path of the fan blades 418 and may include abradable fan track liners and acoustic treatments as are known in the art but not shown here for the sake of clarity. It will also be appreciated that, although incorporating the duct wall 429 into the surface of the aircraft so as to provide a smooth gas washed surface is advantageous, it is not a limitation of the invention and the duct wall 429 can be located on a support structure such as a pylon.

The inlet 430 is positioned such that the first fan unit 416 can ingest and accelerate so called boundary layer air. The boundary layer air is air which forms close to the surface 433 of an aircraft 411 and as such has a low flow velocity.

The second propulsive unit 414 is similar to the first propulsive unit 412 in that it includes a second fan unit 436 having a plurality of blades 438 mounted on a rotatable hub 440. The rotational hub 440 has rotational axis 442 and is mounted to and driven by an electrical machine drive 444. The blades 438, hub 440 and drive 444 are all supported within a duct 446 by a plurality of struts 448. The duct 446 is bounded by a duct wall 450 which resides on top of the first propulsive unit 412 and defines a nacelle 458 and has an inlet 452 for receiving air and an outlet 454 for exhausting air and providing a propulsive force to the aircraft 411. The inlet 452 is positioned so as to predominantly ingest free flow air.

The first propulsive unit 412 is located beneath the second propulsive unit 414 such that the wall which defines the duct of the first propulsive unit supports the second propulsive unit 414. Thus, the first propulsive unit 412 has a rotational axis 422 which is located proximate to the aircraft 411 relative to the rotational axis 442 of the second propulsive unit 414. The first fan unit 416 also has a smaller fan diameter which corresponds to the predominant flow depth of the boundary layer air in which it is located.

The first propulsive unit 412 and second propulsive unit 414 are connected via a duct 460 which extends from the outlet of the first propulsive unit and enters the duct 460 of the second propulsive unit downstream of the second fan unit blades 438. In this way, the boundary layer is accelerated in use to a similar speed as the air flow produced by the second fan unit 436 without the pressure differential on the second fan unit 436.

Figure 5:
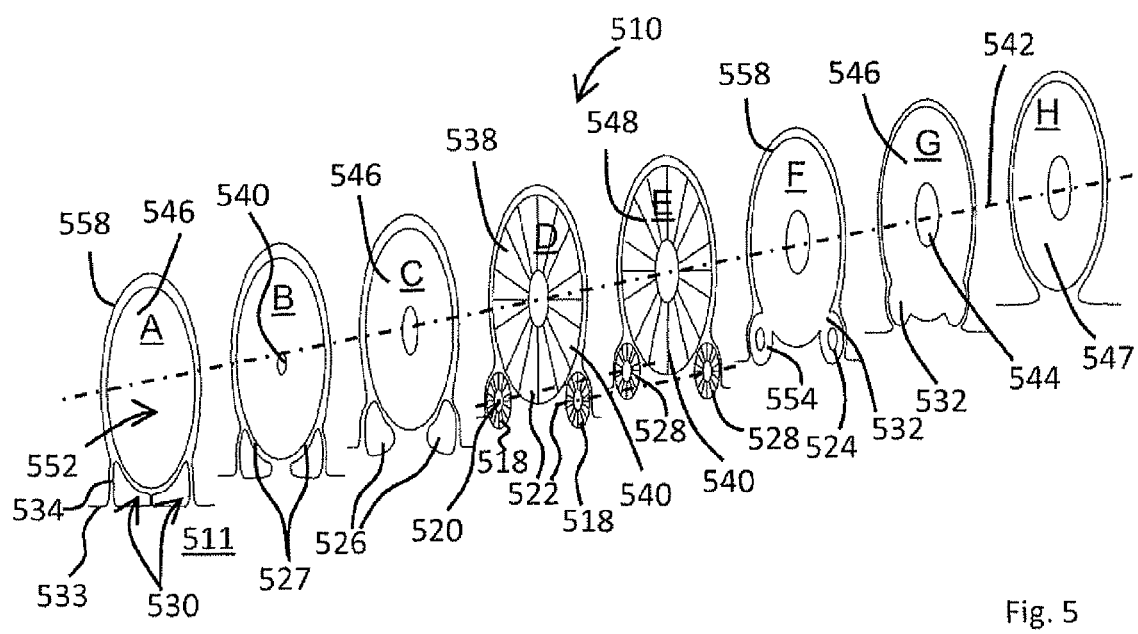
FIG. 5 shows a non-orthogonal expanded axial series of cross sections at evenly spaced intervals along a principal axis of the aircraft propulsive system according to the invention.

FIG. 5 shows an axial series of cross sections, A to H at evenly spaced intervals along the principal axis 542 of the propulsive system and is a variant of the embodiment described in relation to FIG. 4. Hence, there are shown sections of two first propulsive units and a second propulsive unit which are arranged such that the outlets of the propulsive units are combined in a common duct.

The two first propulsive units each include a first fan unit having a plurality of blades 518 mounted on a rotatable hub 520 having a rotational axis 522. The rotatable hub 520 is mounted to and driven by an electrical machine drive 524. The drive 524, hub 520 and blades 518 are supported within a duct 526 by a plurality of struts 528. The duct 526 is bounded by a duct wall and has an inlet 530 for receiving air and an outlet 532 for exhausting air and providing a propulsive force to the aircraft. The outlet 532 of the first fan unit is directed into the duct of the second propulsive unit 546 described below via a length of outlet duct 554 which is downstream of the fan 528.

The first propulsive units are mounted symmetrically on either side of the second propulsive unit on a surface 533 of an aircraft 511 such that the lower parts of the duct 526 walls provide a continuation of the aircraft surface 533 and the exterior side walls define a nacelle 534. The upper surfaces of the ducts 526 provide wall sections 527 which partition the first and second propulsion units upstream of the fan units. As will be appreciated, the ducts 526 are dimensioned to provide a close fit for rotational path of the fan blades 518 at the portion which houses the fan blades and may include abradable fan track liners and acoustic treatments as are known in the art but not shown here for the sake of clarity.

The second propulsive unit is similar to the first propulsive unit in that it includes a second fan unit having a plurality of blades 538 mounted on a rotatable hub 540. The rotatable hub 540 has rotational axis 542 and is mounted to and driven by an electrical machine drive 544. The blades 538, hub 540 and drive 544 are all supported within a duct 546 by a plurality of struts 548. The duct 546 is bounded by a duct wall in the form of a nacelle 558 on the upper portions and the partition wall 527 on the lower side, and has an inlet 552 for receiving air and an outlet for exhausting air and providing a propulsive force to the aircraft.

In this embodiment, the outlets of the first and second propulsive units are combined into a common duct which is downstream of the struts of the second propulsive unit. This is achieved by providing a duct 554 downstream of the first fan units which is initially coaxial with the upstream inlet duct 526. The downstream duct is separated from the duct 546 of the second propulsive unit by the partitioning wall 527 which includes an opening so as to expose it to and combine it with the outlet duct 546 of the second propulsive unit. The opening of the duct increases until the two ducts are combined into a single duct 547.

In further detail, at point A, there is the nacelle 558 which defines an inlet 552 for ingestion of air for the second propulsive unit. The inlet 552 is positioned so as to be separated from the upper surface 533 of the aircraft 511 and thus receive substantially free stream air when in normal use. The skilled person will appreciate that the separation of the nacelle 558 in this manner will be determined by the thickness of the boundary layer air which is to be ingested. This in turn will be dependent on the aircraft 511 and location of the inlet 552 on the aircraft. Beneath the second propulsive inlet are two inlets 530 which ingest air for the two first propulsive units.

The inlets extend into respective ducts 526, 546. The second propulsive unit duct 546 is defined by the nacelle 558 and the partitioning walls 527 and leads to the fan blades 538 as shown at position D. The sides of the first propulsive unit inlets 526 are provided by walls 534 which extend perpendicularly from the upper surface 533 of the aircraft 211 to the underside of the nacelle 558. The inlets 530 extend into passageways 526 which are defined by the upper and side walls of the duct and upper surface 533 of the aircraft 511 and leads to the first propulsive fan unit. Hence, at position D, the ducts have morphed into a substantially circular shape having the rotatable hubs of 520 first fan units at their geometric centres.

The first and second fan units are supported within their ducts 526, 546 via struts 528, 548 in the form of outlet guide vanes, as shown at position E. Downstream of the first fan units, the passageway extends into an outlet duct 554 which gradually opens out into the outlet duct of the second propulsive unit along the length of the duct 554 until a single circular duct is provided. It will be appreciated that as part of the morphing of the outlet ducts, the duct of the second propulsive unit may increase in diameter to provide a larger cross section. However, in other embodiments, it may not be necessary for the duct 446 to increase in diameter as the flow could already be accelerating towards the final nozzle.

The skilled person will appreciate that the positioning and size of the first and second fan units will be dependent on the required performance. This in turn is dependent on the aircraft on which they are employed and the nature of the boundary layer air which is being ingested. The design optimization between boundary layer re-acceleration and intake loss reduction would probably tend to locate the lip of the first fan's nacelle slightly inside the low speed region (and not at the 99% velocity boundary) so that shock losses may be reduced. A practical range of fan diameters might be considered as the first fan having a diameter in the range of between 35 cm and 65 cm and the second fan having a diameter in the range of between 200 cm and 325 cm. Hence, the ratio of the first fan unit diameter to the second fan unit diameter may be between approximately 0.12:1 and 0.3:1. It will be appreciated that these ranges may vary depending on the number installed and the aircraft design and the ratio may be as high as 0.4:1.

A typical example would include a boundary layer air thickness at cruise (approximately 0.85 Mach) in the order of 38 cm to 50 cm at the rear of the fuselage of a large Blended Wing Body aircraft. Therefore, the smaller fan will have a size in the range between 38 cm to 50 cm, that is, approximately a similar size to the expected boundary layer thickness, and the larger fan will have a span in the range between 200 cm and 325 cm. The distance between first and second fans should be kept to a minimum, a sensible maximum being around twice the diameter of the second fan, but preferably within one fan diameter. This helps reduce the formation of boundary layer air downstream of the first fan unit, prior to entering the second fan unit.

The scope of the invention is defined by the claims and the above embodiments should not be taken as limitations of the claimed invention. For example, although the embodiments refer to electrically driven fans, either or both of the propulsive units may be gas turbines, or driven by some other means such as hydraulically or pneumatically. The power required to drive one of the propulsive units may be taken from the other propulsive unit. The electrical power for driving the fan units in the described embodiment may be taken from one or more electrical sources. For example, the aircraft may include one or more electrical generators powered by one or more gas turbine engines.

The invention claimed is:

1. An aircraft comprising:
    a first propulsive unit including:
        a first fan having a first axis of rotation, the first fan including a duct having an inlet and an outlet, the duct of the first enclosing a plurality of blades of the first fan between the inlet and the outlet of the first fan, and
        a first drive configured to drive rotation of the first fan; and
    a second propulsive unit including:
        a second fan having a second axis of rotation, the second fan including a duct having an inlet and an outlet, the duct of the second fan enclosing a plurality of blades of the second fan between the inlet and the outlet of the second fan, and
        a second configured to drive rotation of the second fan, wherein:
    the rotational axis of the first fan is proximate to a surface of the aircraft relative to the rotational axis of the second fan such that the first fan receives boundary layer air, and the second fan is arranged to receive free stream air, and the second fan is located so as to receive an airflow including accelerated boundary layer air exhausted from the outlet of the first fan at a position upstream of the outlet of the second fan.

2. The aircraft as claimed in claim 1, wherein a diameter of the first fan is smaller than a diameter of the second fan.

3. The aircraft as claimed in claim 1, wherein the first fan is arranged upstream of the second fan and the arrangement of the first fan and the second fan accelerates boundary layer air exhausted from the outlet of the first fan is received by the second fan along with the free stream air.

4. The aircraft as claimed in claim 1, wherein the second fan is adjacent to the surface of the aircraft.

5. The aircraft as claimed in claim 1, further comprising a plurality of first propulsive units for each second propulsive unit.

6. The aircraft as claimed in claim 1, further comprising a duct through which accelerated boundary layer air exhausted from the outlet of the first fan is ducted into the duct of the second fan at a location downstream from the blades of the second fan.

7. The aircraft as claimed in claim 1, wherein a ratio of the first fan diameter to the second fan diameter is between 0.12:1 and 0.4:1.

8. The aircraft as claimed in claim 1, wherein an axial separation between the outlet of the first fan and second fan is a maximum of twice the second fan diameter.

* * * * *